(12) United States Patent
Obendiek et al.

(10) Patent No.: US 6,695,384 B2
(45) Date of Patent: Feb. 24, 2004

(54) TOP FOR A CONVERTIBLE VEHICLE

(75) Inventors: Klaus Obendiek, Passau (DE); Jason Bowles, Owosso, MI (US)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 0 days.

(21) Appl. No.: 10/241,131

(22) Filed: Sep. 10, 2002

(65) Prior Publication Data

US 2003/0052507 A1 Mar. 20, 2003

(30) Foreign Application Priority Data

Sep. 11, 2001 (DE) ......................... 101 44 583

(51) Int. Cl.[7] .............................. B60J 10/10
(52) U.S. Cl. ............ 296/107.09; 296/116; 296/107.15; 296/107.16
(58) Field of Search ................ 296/108, 116, 296/107.09, 109.08, 107.15, 107.16

(56) References Cited

U.S. PATENT DOCUMENTS 5,335,959 A * 8/1994 Schrader et al. ............ 296/108
6,139,087 A 10/2000 Wolfmaier et al. .... 296/107.16
6,464,284 B2 * 10/2002 Neubrand .............. 296/107.01

FOREIGN PATENT DOCUMENTS

| DE | 19801876 | 7/1999 | |
|----|----------|--------|---|
| DE | 29901589 | 8/2000 | |
| DE | 19613356 | 10/2000 | |
| GB | 2 257 399 | * 1/1993 | ................. 296/108 |

* cited by examiner

Primary Examiner—Joseph D. Pape
(74) Attorney, Agent, or Firm—Davidson, Davidson & Kappel, LLC

(57) ABSTRACT

A top for a convertible vehicle, including a roof frame extending from a rear region of the convertible vehicle as far as a windshield arranged between A-pillars of the convertible vehicle in a closed state of the top. The roof frame includes at least one rear frame piece, a central frame piece connected in an articulated manner to the rear frame piece, and a front frame piece. The top also includes a front element and a cover of the top fixed to the front element. The front frame piece is connected in an articulated manner directly to the central frame piece, and the front element is connected pivotably with respect to the front frame piece to the front frame piece.

15 Claims, 5 Drawing Sheets

TOP FOR A CONVERTIBLE VEHICLE

Priority to German Patent Application No. 101 44 583.0-21, filed Sep. 11, 2001 and hereby incorporated by reference herein, is claimed.

BACKGROUND INFORMATION

The invention relates to a top for a convertible vehicle, comprising a roof frame, said roof frame, in a closed state of the top, extending from a rear region of the convertible vehicle as far as a windshield arranged between A-pillars; said roof frame comprising at least one rear frame piece, a central frame piece, said central frame piece being connected in an articulated manner to the rear frame piece, and a front frame piece; a front element; a cover of the top, said cover being fixed to said front element.

In the construction of modern convertible vehicles, increasing importance is attached to the fully automatic execution of opening and closing processes of convertible tops. As far as possible, the vehicle driver should not have to intervene at any point of the opening or closing process of a convertible vehicle. This also includes it no longer being necessary to provide a convertible top which has been opened and folded together with a covering for its protection, for example by means of a tarpaulin. A particularly effective solution is provided if, in the opened state of the top, part of the convertible top simultaneously undertakes the function of a covering, at least of part of the top.

DE 196 13 356 C2 describes a top for a convertible vehicle, in which a roof frame is divided into three frame pieces which can move relative to one another, the front frame piece, which, in a closed state of the top, is adjacent to the windshield, being pivoted parallel over the central frame piece by means of a four-bar linkage arrangement, during an opening process. In this case, it has proven problematic in the practical implementation of an arrangement of this type that the sealing elements, which are to be attached to the frame pieces and seal the top on the convertible vehicle, are moved unfavorably with respect to one another, at least at the start of the opening movement or at the end of the closing movement. In addition, the fabric of the convertible top extends as far as the front edge of the top, where it is fixed to a front bow. Due to the mechanism, which is present, the length ratio between the front frame piece and the central frame piece is variable only to a small extent, the front frame piece, in particular, being of significantly shorter design than the rear frame piece.

DE 198 01 876 A1 describes a top for a convertible vehicle, which, with respect to the present invention, is identical with the one described in DE 196 13 356 C2.

DE 299 01 589 U1 describes a top for a convertible vehicle, comprising three frame pieces and a rigid front part being fixedly connected to the front frame piece. In an opening movement of the top, the rigid front part is being pivoted into an inverted position and therefore not suited to form out a cover for the folded top in the open state.

SUMMARY OF THE INVENTION

An object of the present invention is to provide a top for a convertible vehicle, in which great flexibility in the design of the length ratios of the frame pieces is made possible.

It is a further object of the invention to provide a top for a convertible vehicle in which a particularly simple and reliable arrangement of seals is made possible.

These and further objects are achieved by the invention.

A top for a convertible vehicle according to the invention comprises a roof frame, said roof frame, in a closed state of the top, extending from a rear region of the convertible vehicle as far as a windshield arranged between A-pillars; said roof frame comprising at least one rear frame piece, a central frame piece, said central frame piece being connected in an articulated manner to the rear frame piece, and a front frame piece; a front element; a cover of the top, said cover being fixed to said front element; said front frame piece being connected in an articulated manner directly to said central frame piece; and said front element being connected pivotably with respect to said front frame piece to said front frame piece.

In this arrangement, a top is advantageously provided in which, firstly, a front frame piece is connected in an articulated manner directly to a central frame piece, but, at the same time, a front element of the top is fixed in an articulated manner on the front frame piece, with the result that during an opening movement of the top the front element is advantageously pivoted essentially parallel over a central section of the top and, during the entire opening movement, essentially retains its orientation in accordance with the closed state of the top. In a particularly advantageous manner, such a front element of a top according to the invention can then be formed as a hard shell part in such a manner that, in the opened position of the top, it is used at the same time as an at least partial covering of the top which has been folded together and deposited in a rear region of the motor vehicle. In this arrangement, the front element is connected to the convertible top fabric.

The retention of the orientation of the front element is achieved in a particularly advantageous manner by the front element, which is pivotably attached to the front frame piece, being articulated by means of a front control link which is fixed in an articulated manner by its other end to the front frame piece.

In an advantageous refinement of a folding top according to the invention, the pivoting of the front frame piece relative to the central frame piece is activated via a central control link, and the pivoting of the central frame piece relative to the rear frame piece is activated via a rear control link, the roof frame being designed as a whole as a chain of essentially three four-bar linkages which overall form a positively controlled chain of links. Thus, by simple activation preferably of the rear frame piece or of the rear control link via a driving device, the entire kinematics of the top can be moved in a defined manner.

In order to make possible, in a simple manner, a particularly large pivoting angle of the front frame piece relative to the central frame piece, the central control link is first of all connected in an articulated manner to a toggle lever element, the toggle lever element being connected in an articulated manner at one end to the front frame piece and at the other end to the central frame piece.

In order, in the closed state of the top, to seal the top on the convertible vehicle in a simple and low-wearing manner, a front, a central and a rear seal are advantageously provided on the respective front, central and rear frame pieces. In this case, the simple, hinged pivoting of two frame pieces in each case with respect to each other ensures a low-friction and precise positioning of the respective seals with respect to one another.

In the interests of constructing a top according to the invention in a manner which is as modular and compact as possible, a main bearing unit comprising a driving device is fixed on the bodywork of the convertible vehicle, the top being articulated with its rear frame piece and a rear control link on the main bearing unit, so that by using the driving device to drive the rear frame piece or the rear control link, pivoting of the entire, positively controlled top mechanism is ensured in a simple manner. In addition, a corner bracket which is known per se and, in the closed state of the top, engages on the fabric of the top, is articulated pivotably likewise in the region of the main bearing unit.

In a known manner, a rear window is incorporated in the top fabric, it being possible for the rear window, on account of the well-defined and automated opening and closing movement of a top according to the invention, also to consist of a hard or at least stiff material without having to worry about the rear window becoming damaged during the opening or closing process of the top.

Further features and advantageous of the invention emerge from the exemplary embodiment described below and from the claims.

BRIEF DESCRIPTION OF THE DRAWINGS

A preferred exemplary embodiment of a top according to the invention is described below and explained in greater detail with reference to the attached drawings, in which.

DETAILED DESCRIPTION OF A PREFERRED EMBODIMENT

Figure 1:
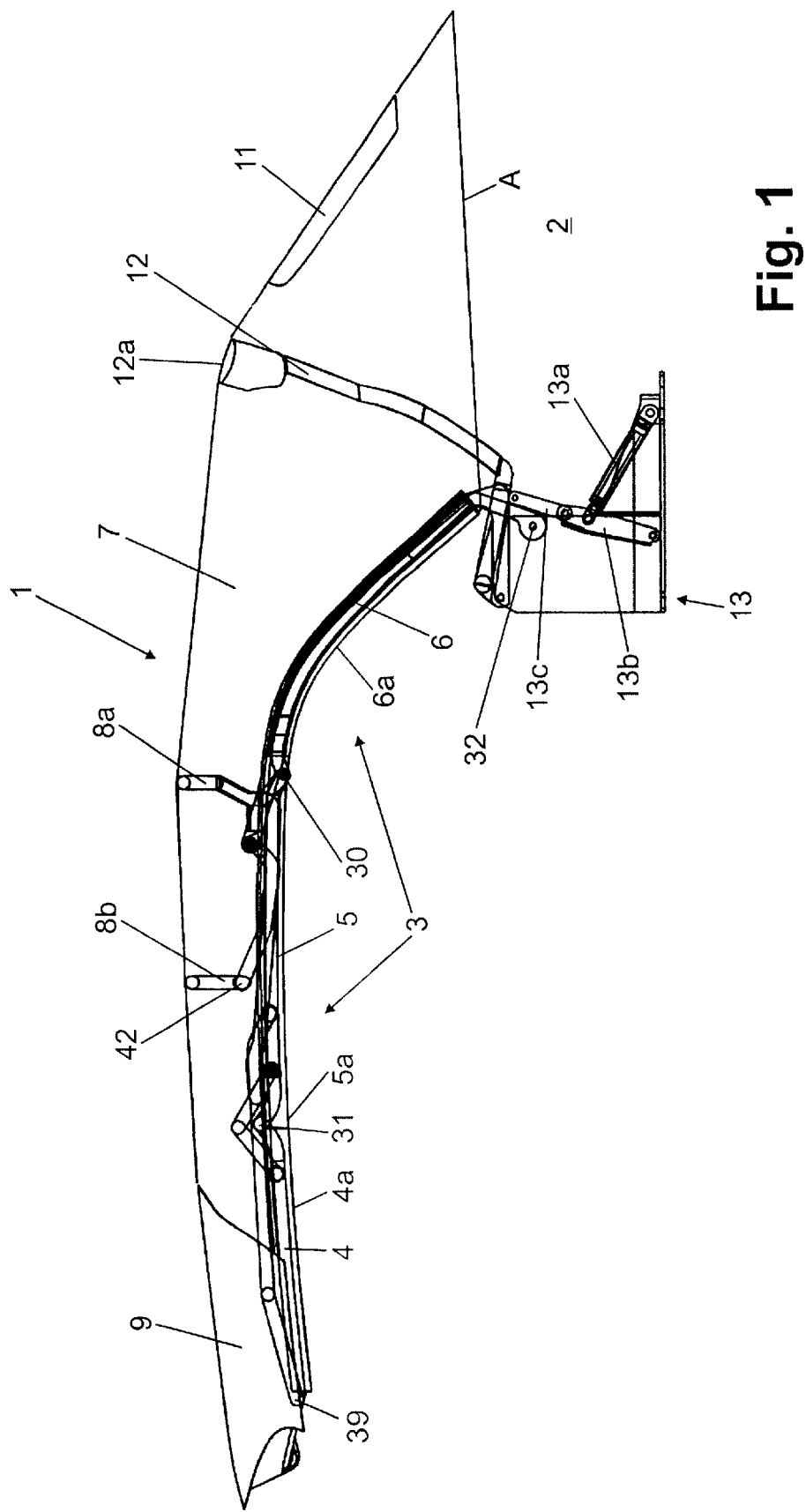
FIG. 1 shows a side view of a top according to the invention in a closed state.

FIG. 1 shows a top 1 according to the invention in a closed state, said top having a multi-piece roof frame 3 which runs from a rear region 2 of the convertible vehicle as far as the region of the windshield and which essentially comprises a front frame piece 4, a central frame piece 5 and a rear frame piece 6. A front seal 4a, a central seal 5a and a rear seal 6a are respectively fixed on the respective frame pieces, said seals, in the closed state of the top according to FIG. 1, sealing the top according to the invention against the convertible vehicle, for example on window edges.

In a known manner, a respective roof frame 3 is provided on each of the sides of the vehicle, the two roof frames on the sides of the vehicle being of mirror-symmetrical design with respect to each other, and hence only one of the roof frames is shown in FIGS. 1 to 5 and will be described below.

The central frame piece 5 is connected pivotably to the rear frame piece 6 by means of a rotational joint 30. The front frame piece 4 is connected pivotably to the central frame piece 5 by means of a rotational joint 31. The rear frame 6 is connected pivotably by means of a rotational joint 32 to a main bearing unit 13, which is fixed on the bodywork of the convertible vehicle.

Figure 3:
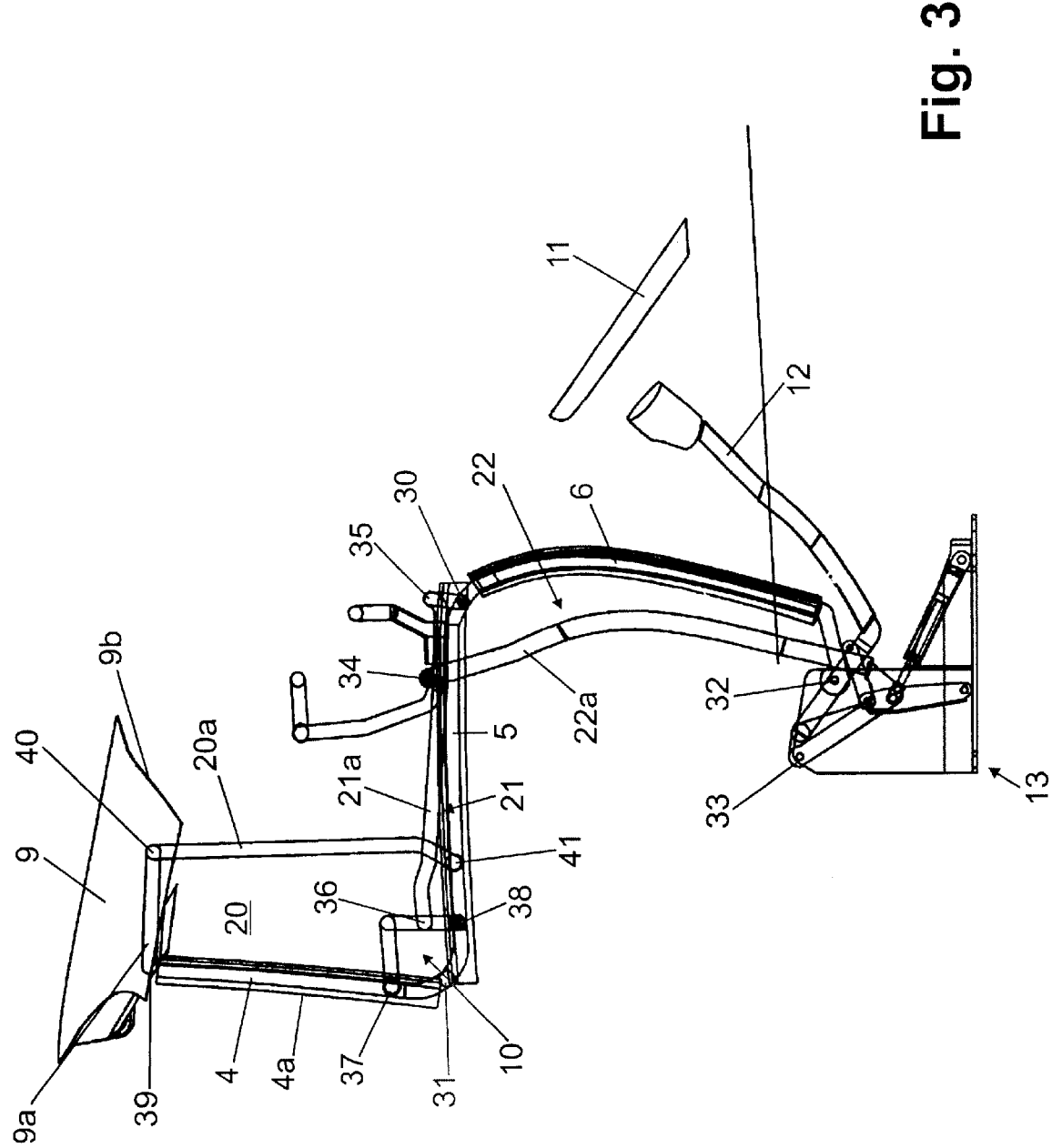
FIG. 3 shows a side view of the top according to the invention from FIG. 1 in a second step in an opening movement.

FIG. 3, in particular, shows how the three frame pieces 4, 5, 6 are connected by means of control links to form an overall positively controlled chain of links. In this arrangement, a rear control link 22a is articulated at one end on the main bearing unit 13 by means of a rotational joint 33 and at the other end is connected pivotably to the central frame piece 5 by means of a rotational joint 34. A central control link 21a is connected in an articulated manner at one end to the rear frame piece 6 by means of a rotational joint 35 and at the other end controls a toggle lever element 10 by means of a rotational joint 36, the toggle lever element 10 comprising two levers which are connected pivotably to each other and of which the one is articulated on the front frame piece 4 by means of a rotational joint 37 and the other is articulated on the central frame piece 5 by means of a rotational joint 38.

In a front end region of the front frame piece 4, a front element 9 is held pivotably on the front frame piece 4 by means of a rotational joint 39. A front control link 20a is articulated at one end, at a distance from the rotational joints 39, on the front element 9 in a rotational joint 40 and at the other end is connected to the central frame piece 5 via a rotational joint 41.

All in all, the preferred exemplary embodiment of a top 1 according to the invention can therefore be schematized as a positively controlled chain of essentially three four-bar linkages. In this arrangement, a base of a rear four-bar linkage 22 is formed by the main bearing unit 13, the two links of the rear four-bar linkage 22 are formed by the rear control link 22a and rear frame piece 6, and the coupler of the rear four-bar linkage 22 is formed by the central frame piece 5. The base of a central four-bar linkage 21 is formed by the rear frame piece 6, the two links of the central four-bar linkage 21 being formed by the central frame piece 5 and the central control link 21a, and the coupler of the central four-bar linkage 21 being formed in a functional sense by the front frame piece 4. It should be stressed here that the central control link 21a is not directly articulated on the front frame piece 4, but via the toggle level element 10. Although, in terms of functioning principle, the central control link 21a could be articulated directly on the front frame piece 4, in the present exemplary embodiment the articulation via a toggle lever arrangement 10 placed in between is preferred, since a particularly large pivoting angle between the front frame piece 4 and central frame piece 5 is made possible in a simple manner by means of the toggle lever arrangement 10. The base of a front four-bar linkage 20 is formed by the central frame piece 5, the two links of the front four-bar linkage 20 being formed by the front frame piece 4 and the front control link 20a. The front element 9 forms the coupler of the front four-bar linkage 20. In the present exemplary embodiment, the front element 9 is designed as a hard shell part, which is firmly connected to a coupler link 9a, which forms the coupler of the front four-bar linkage 20.

A first bow 8a and a second bow 8b, which run essentially in the transverse direction of the vehicle, are arranged between the roof frames 3 extending in the lateral regions of the convertible vehicle. The first bow 8a is connected fixedly to the central frame piece 5 whereas the second bow 8b is articulated on the central frame piece 5 in a manner such that it pivots about the transverse direction of the vehicle, and has a further intermediate joint 42, so that the position of the second bow 8b relative to the central frame piece 5 can be varied via two joints.

A fabric 7 (see FIG. 1) of the top 1 according to the invention is fixed on a rear end 9b of the front element 9, is connected to the frame pieces 4, 5, 6 of the roof frame 3 and is supported on the two bows 8a, 8b, at least in the closed state of the top according to FIG. 1. In addition, a corner bracket 12 is accommodated pivotably in the region of the main bearing unit 13. As FIG. 1 shows in particular, in a closed state of the top the corner bracket 12 is pivoted upward and supported against the fabric 7 of the top 1 in such a manner that a rear, upper roof edge 12a is formed.

A rear window 11, which consists of a firm material, is incorporated in the fabric 7 of the top 1.

The invention functions as follows:

Starting from the closed state of the top according to FIG. 1, a driving cylinder 13a, which is arranged in the region of the main bearing unit 13, is extended in order to initiate an opening process of the top 1 according to the invention. This pivots a first intermediate link 13b which is connected to a second intermediate link 13c which, again via an articulated connection, pivots the rear frame piece 6 in the clockwise direction. The positively controlled movement of the previously described kinematics of a top 1 according to the invention therefore takes place in a manner brought about by the deflection of the rear frame piece 6. The corner bracket 12 is also pivoted in a positively controlled manner by means of particular parts (not illustrated) of the main bearing unit 13. Such configurations of main bearing units, which simultaneously permit the movement of a corner bracket and of a frame piece of a top 1, are known per se.

Figure 2:
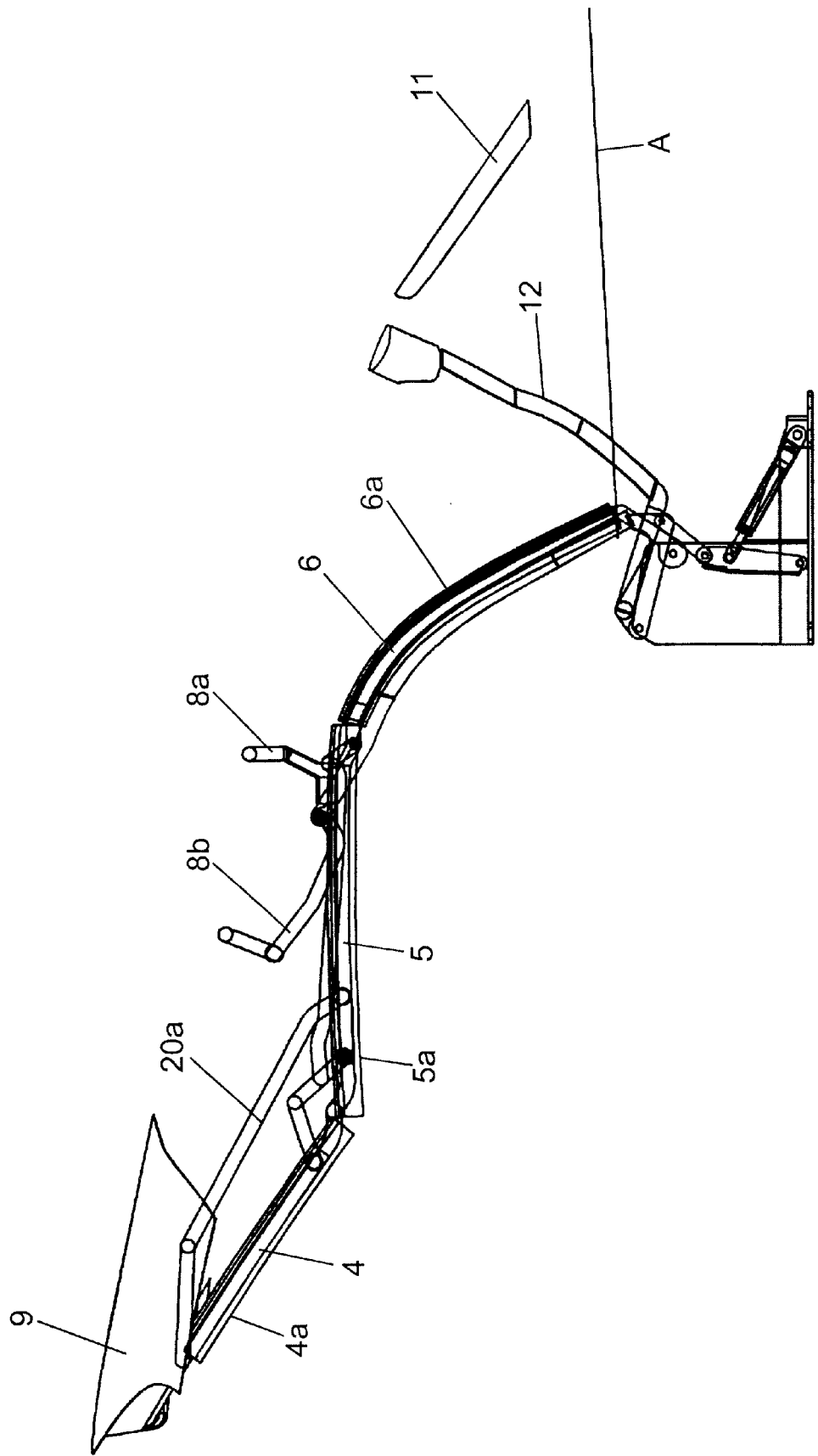
FIG. 2 shows a side view of the top according to the invention from FIG. 1 in a first step in an opening movement.

As FIG. 2 in particular shows, in a first step of the opening movement of the top 1 according to the invention, the front element 9 is essentially pivoted upward and rearward from the region of the windshield of the convertible vehicle, the orientation of the front element 9 in spatial terms essentially being maintained. In addition, a further function of the toggle lever arrangement 10 is apparent from a comparison between FIG. 1 and FIG. 2. In a closed state of the top according to FIG. 1, in which the fabric of the top 1 is placed under tension by means of the corner bracket 12, it can be seen that a longitudinally directed tensile force is exerted on the roof frame 3 via the connection of the fabric 7 to the front element 9 via the joint point 39, at which the front element 9 is articulated on the front frame piece 4. However, in the region of the articulated connection 31 between the front frame piece 4 and the central frame piece 5, the frame pieces 4, 5 are each formed such that they are bent, with the result that the joint 31 lies above the joint 39. There is therefore a position of the joint 31 which is beyond the dead center with regard to the previously described tensile forces of the fabric 7, so that the top 1 is securely held in the closed top position by means of such a position beyond the dead center. However, since the central control link 21a does not engage directly on the front frame piece 4, but engages on the front frame piece 4 via the joint 36 and the toggle lever arrangement 10, and since the toggle lever arrangement 10 is supported at the same time on the central frame piece 5, a simple tensile force, which is exerted in the rear direction on the central control link 21a, already makes it possible for the position beyond the dead center between the front frame piece 4 and central frame piece 5 to be overcome.

Figure 4:
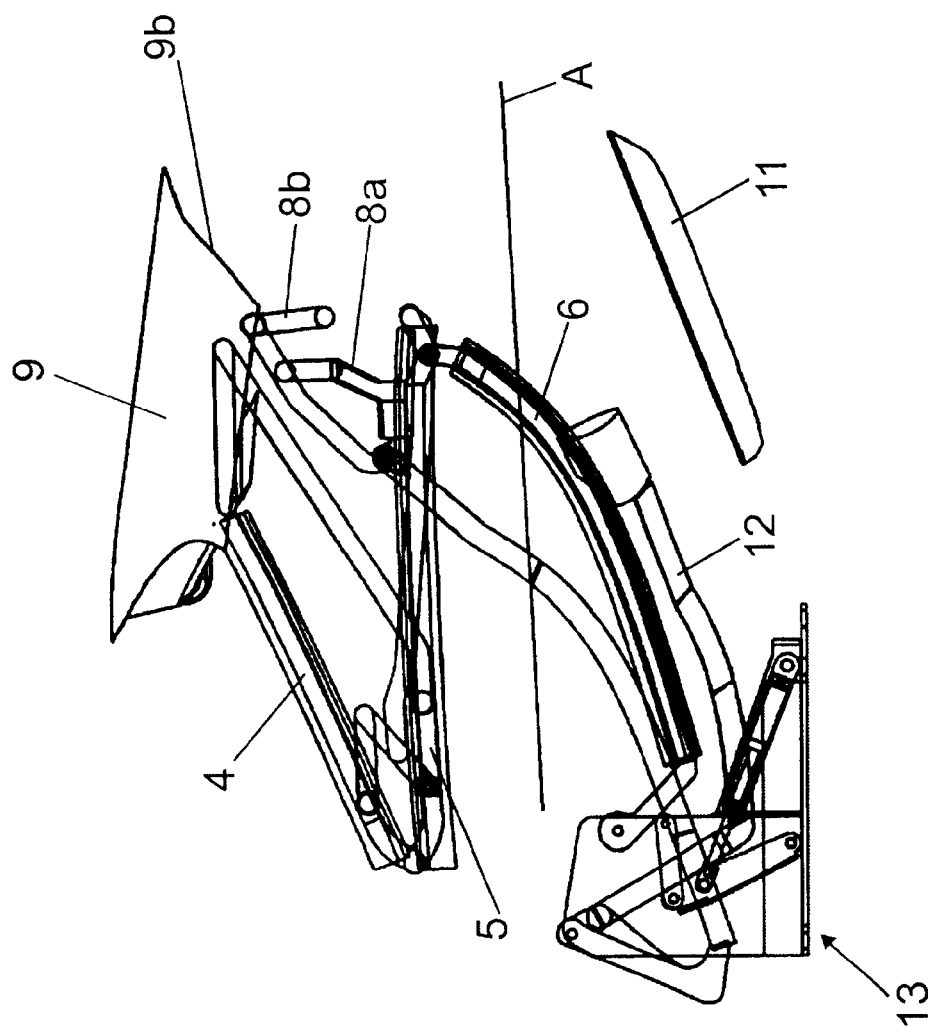
FIG. 4 shows a side view of the top according to the invention from FIG. 1 in a third step in an opening movement.

From the further steps of a top opening movement according to FIG. 3 and FIG. 4, it is apparent that the front element 9 remains oriented essentially parallel to the central frame piece 5 during the entire top opening movement, but is pivoted relative to the central frame piece 5 in accordance with the movement of the front four-bar linkage 20. In a position which is inverted with respect to the starting position, the front frame piece 4 is pivoted onto the central frame piece 5, and the central frame piece 5 is pivoted, retaining its essentially horizontal alignment, onto the rear frame piece 6, which undertakes pivoting in the clockwise direction through a pivoting angle of more than 90° relative to the closed top position.

Figure 5:
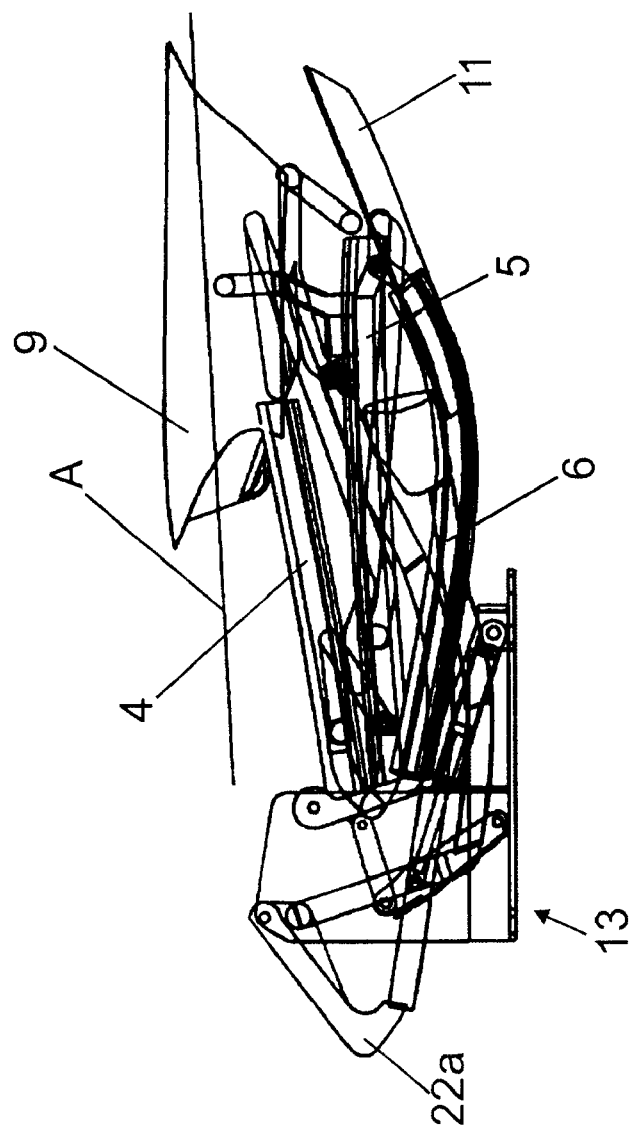
FIG. 5 shows a top according to the invention from FIG. 1 in an opened position in which it is deposited in the rear region of the convertible vehicle.

The storage position, which is ultimately reached and is shown in FIG. 5, of the top 1 according to the invention, which has been opened and folded together, makes it clear that a top 1 according to the invention can be deposited in a particularly compact form in the rear region 2 of a convertible vehicle. In the deposited position, the front element 9, which is designed as a hard shell element, simultaneously takes on the function of an at least partial covering of the top 1 according to the invention.

The passage space required by the pivoting of the top 1 according to the invention in the rear region of the convertible vehicle is indicated by the line A. This line A corresponds at the same time to the cross section of the rear lower edge of the fabric 7 (see FIG. 1). This spatial requirement defined by the rear lower edge of the fabric 7 is visibly not exceeded in any section of the top opening movement. According to FIG. 5, the front element 9 in the opened top position covers only part of the line A, but it can be seen without difficulty that the pivotable fixing of the front element on the front frame piece results in a large degree of freedom, which is independent of the dimensioning and shaping of the front frame piece, in the dimensioning and shaping of the front element 9, with the result that also a more extensive covering of the necessary passage opening in the rear region 2 of the convertible vehicle is possible.

What is claimed is:

1. A top for a convertible vehicle, the top comprising
   a roof frame, said roof frame, in a closed state of the top, extending from a rear region of the convertible vehicle as far as a windshield arranged between A-pillars of the convertible vehicle;
   said roof frame including at least one rear frame piece, a central frame piece, said central frame piece being connected in an articulated manner to the rear frame piece, and a front frame piece;
   a front element; and
   a cover of the top, said cover being fixed to said front element; said front frame piece being connected in an articulated manner directly to said central frame piece; said front element being connected pivotably with respect to said front frame piece.

2. The top as claimed in claim 1, wherein the front element is articulated via a front control link.

3. The top as claimed in claim 2, wherein the front control link is connected in an articulated manner at its one end to the central frame piece and at its other end to the front element.

4. The top as claimed in claim 1, wherein the roof frame comprises a front four-bar linkage, a central four-bar linkage and a rear four-bar linkage.

5. The top as claimed in claim 4, wherein a pivoting of the front frame piece relative to the central frame piece can be activated via a central control link.

6. The top as claimed in claim 5, wherein the central control link is connected in an articulated manner to a toggle lever element, the toggle lever element being connected in an articulated manner at one end to the front frame piece and at the other end to the central frame piece.

7. The top as claimed in claim 4, wherein a pivoting of the central frame piece relative to the rear frame piece can be activated by means of a rear control link.

8. The top as claimed in claim 4, wherein the roof frame, as a whole, includes a positively controlled chain of links.

9. The top as claimed in claim 1, further comprising at least one bow connected to one of the frame pieces of the roof frame, the cover being connected to the at least one bow.

10. The top as claimed in claim 1, further comprising a front seal disposed on the front frame piece configured to seal the top on the convertible vehicle.

11. The top as claimed in claim 1, further comprising a central seal disposed on the central piece and a rear seal disposed on the rear frame piece, the central and rear seals configured to seal the top on the convertible vehicle.

12. The top as claimed in claim 1, further comprising and a rear window of the convertible vehicle, the rear window being accommodated in the cover.

13. The top as claimed in claim 1, further comprising a main bearing unit having a driving device fixed on a body of the convertible vehicle, the rear frame piece being connected movably to the main bearing unit.

14. The top as claimed in claim 1, further comprising a pivotable corner bracket, the corner bracket, in the closed state of the top, engaging the cover.

15. The top as claimed in claim 1, wherein the roof frame is disposed on a first side of the convertible vehicle and further comprising a second roof frame disposed on a second side of the convertible vehicle, the second roof frame being of essentially mirror-symmetrical design with respect to the roof frame.

* * * * *